United States Patent [19]

Popp

[11] Patent Number: 5,152,649
[45] Date of Patent: Oct. 6, 1992

[54] DEVICE FOR SETTING ANCHORS

[75] Inventor: Franz Popp, Buchloe, Fed. Rep. of Germany

[73] Assignee: Hilti Aktiengesellschaft, Furstentum, Liechtenstein

[21] Appl. No.: 607,370

[22] Filed: Oct. 31, 1990

[30] Foreign Application Priority Data

Nov. 10, 1989 [DE] Fed. Rep. of Germany ....... 3937417

[51] Int. Cl.$^5$ .................. F16B 13/06; F16B 37/08; B23P 19/02
[52] U.S. Cl. .................................. 411/55; 411/14; 411/432; 411/917; 405/259.4; 29/256
[58] Field of Search ................. 411/14, 53, 55, 57, 411/44, 60, 432, 917, 434; 52/698, 704; 405/259.1, 259.2, 259.3, 259.4; 29/238, 240, 244, 256, 264

[56] References Cited

U.S. PATENT DOCUMENTS

| | | | |
|---|---|---|---|
| 2,571,265 | 10/1951 | Leufven | 411/434 |
| 3,120,700 | 2/1964 | Chuplis, Jr. | 29/240 |
| 4,085,649 | 4/1978 | Christensson | 411/434 |
| 4,899,431 | 2/1990 | Borntrager | 411/55 |

Primary Examiner—Neill R. Wilson
Attorney, Agent, or Firm—Anderson Kill Olick & Oshinsky

[57] ABSTRACT

A device for setting an anchor rod (3) in a borehole includes a housing (4) and a socket (5). The socket (5) is made up of a sleeve (6) and a liner (7). The sleeve (6) is rotatable relative to the housing (4) and the liner (7). The liner (7) is in threaded engagement with the anchor rod (3) by a standard thread and with the sleeve (6) by a fine pitch thread (6c). Due to the fine pitch thread engagement of the sleeve (6) and the liner (7), by rotating the sleeve (6), which remains axially stationary, the liner (7) and the anchor rod (3) are moved axially with the anchor and also moving axially relative to an expansion sleeve (2) so that the expansion sleeve (2) is expanded into an undercut in the borehole.

7 Claims, 1 Drawing Sheet

U.S. Patent
Oct. 6, 1992
5,152,649
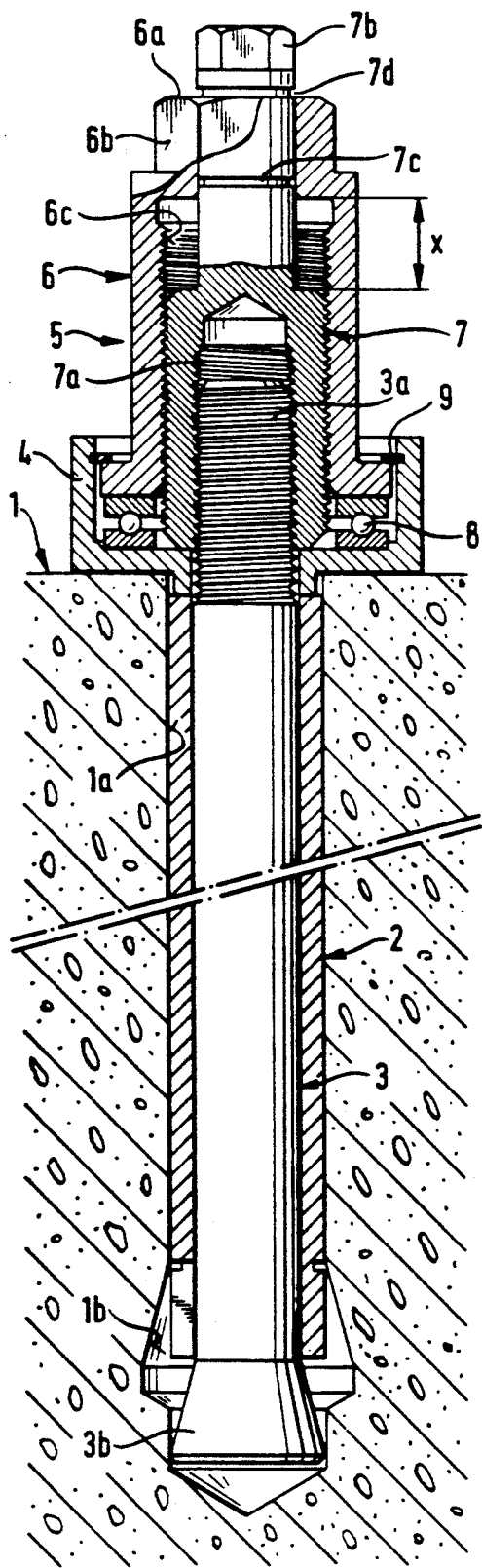
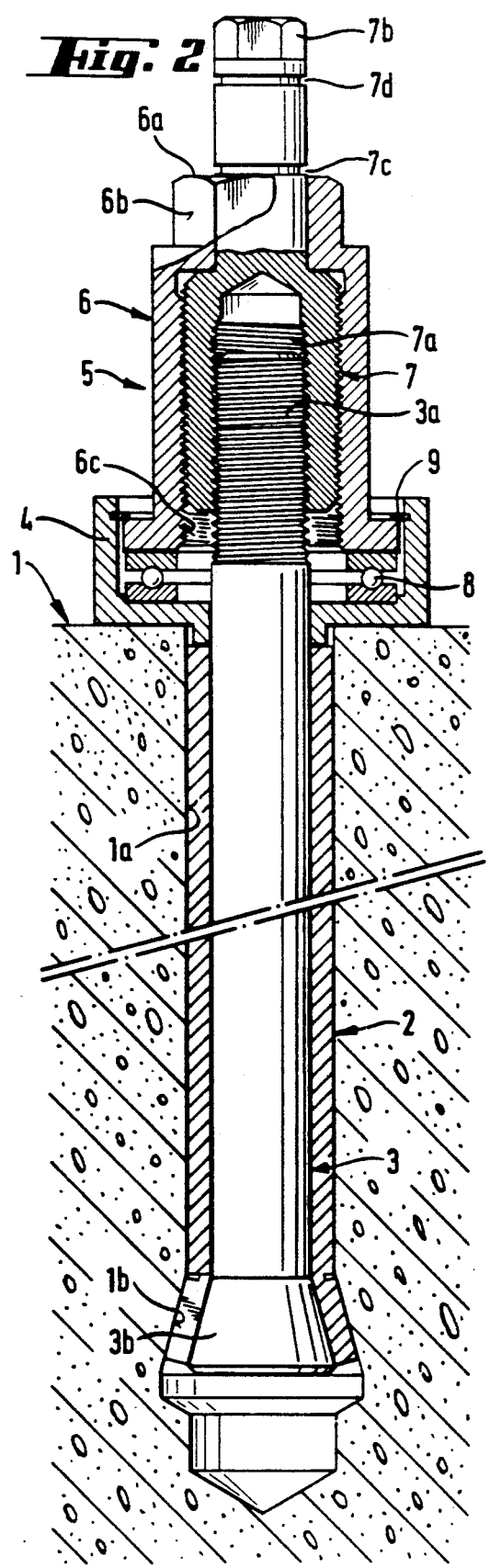

DEVICE FOR SETTING ANCHORS

BACKGROUND OF THE INVENTION

The present invention is directed to a device for setting anchors formed of an expansion sleeve and an anchor rod with an expanding member on the end of the anchor rod. A housing abuts in the axial direction against a trailing end of the expansion sleeve. A socket is in threaded engagement with the anchor rod and is rotatably supported relative to the housing. The socket has engagement means for rotating it about the axis of the anchor rod.

In the crack-prone tension zone of a structure, so-called undercut anchors are used for reasons of safety. Such undercut anchors are distinguished by a positive locking connection with the structure, so that the full anchoring value is maintained even if the borehole widens due to the development of cracks.

An anchor satisfying the above requirements is disclosed in EU-A-O 226,525. To attain the full anchoring value with this anchor a prestress is required. Due to the prestress, which is achieved by a suitable device, segments of the expansion sleeve are displaced into the undercut region of a borehole.

The device for prestressing undercut anchors as disclosed in EU-A-O 226,525 has the particular disadvantage that the thread on the anchor rod must be used as the prestressing means. As a result, this thread is subject to a large load during the prestressing or pretensioning operation, and in some circumstances can lead to damage. Furthermore, because of the usual pitch of such a thread extraordinarily high torque must be provided for the pretensioning operation.

SUMMARY OF THE INVENTION

Therefore, the primary object of the present invention is to create a device for setting anchors which permits the expansion of the anchor with a relatively small application of force and at the same time protecting the anchor from damage.

In accordance with the present invention, the device includes a socket made up of a sleeve enclosing a liner with threaded engagement means between the sleeve and liner while the liner is also in threaded engagement with the anchor rod.

Accordingly, the two part socket has the liner connected to the anchor rod by one threaded connection while the sleeve is connected to the liner by another threaded connection. While the anchor is being set, the threaded engagement of the liner and the anchor rod remain stationary, that is, there is no relative axial movement between the liner and anchor rod. The threaded engagement of the liner and the sleeve affords the relative motion of the anchor rod with respect to the expansion sleeve. This threaded connection can be optimized for this application and, for instance, is formed with a trapezoidal thread. By a particularly favorable pairing of materials, such as steel and bronze, friction losses can be minimized.

In the setting operation, a relatively high application of force is required, particularly in the terminal phase of the setting operation. To reduce the required force, the threaded connection between the sleeve and the liner is provided by a fine pitch thread. Such a fine pitch thread has a smaller pitch as compared to the conventional or standard thread connection between the liner and anchor rod and thus has a smaller pitch angle. The step-up resulting from this arrangement is higher than with the so-called standard of conventional thread.

The pitch of the fine pitch thread is appropriately about 1 to 3 mm. As a result a lead of 1 mm applies for a thread with a nominal diameter of 8 mm. A standard fine pitch thread with a 3 mm lead has a nominal diameter of at least 36 mm.

Preferably, the socket is constructed with the sleeve as an outer part and the liner as an inner part in threaded engagement with the anchor rod. The sleeve has a throughbore and the liner is provided with a threaded blindbore corresponding to the thread on the anchor rod.

In preparation for the setting operation, initially the setting device is threaded onto the anchor rod. Accordingly, it is preferable for the liner to project axially beyond the end of the sleeve which is at the trailing end relative to the setting direction. The part of the liner projecting out of the sleeve is clearly visible from the outside and affords information about the setting state of the anchor being secured.

As a result, the liner is screwed onto the anchor rod. It is advantageous that the part of the liner projecting axially out of the sleeve has rotary driving means. Such rotary driving means can be flats on which an open end wrench can be applied or internal or external polyhedrons.

After the liner is threaded onto the anchor rod, relative rotation between the sleeve and the liner can take place during the setting operation. Accordingly, a relative axial displacement of the liner with respect to the sleeve is effected due to the threaded connection between the liner and the sleeve. To recognize the setting state of the anchor on the outside, it is advantageous that the trailing end region of the liner has markings signaling the set position of the anchor. For instance, such marking can be formed as cuts or colored rings. For example, a green ring can be visible at the commencement of the setting operation and, when the intended expansion state has been reached, a green ring also become visible. As a result, the axial travel required for achieving the expansion of the anchor is the axial distance between the green ring and the red ring.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF THE DRAWINGS

In the drawings:

FIG. 1 is an axially extending sectional view of a device embodying the present invention shown at the commencement of the setting operation; and FIG. 2 is a view similar to FIG. 1 illustrating the device after the setting of the anchor has been completed.

DETAILED DESCRIPTION OF THE INVENTION

In FIGS. 1 and 2, a device is shown for setting an anchor in a borehole 1a of a structure 1. The anchor is made up of an axially extending expansion sleeve 2 and an axially extending anchor rod 3 passing through the expansion sleeve 2. As viewed in the drawing, the expansion sleeve 2 and anchor rod 3 have a leading end at the lower end and a trailing end at the upper end relative to the insertion direction of the anchor into the borehole 1a. The anchor rod 3 projects axially out of the trailing end of the expansion sleeve 2. At its leading end, anchor rod 3 has a conically shaped expanding member 3b which is drawn rearwardly into the expansion sleeve 2 during the setting operation, note FIG. 2. For an axially extending portion at its trailing end, anchor rod 3 has a conventional or standard thread 3a. The setting device comprises a housing 4 and a socket 5 rotatably supported in the housing 4. Socket 5 is made up of an axially extending sleeve 6 laterally enclosing an axially extending liner 7. The sleeve 6 has engagement means 6b at its trailing end 6a for turning or rotating the sleeve 6 about the axis of the anchor rod 3. The throughbore in the sleeve 6 has a fine pitch thread 6c. Liner 7 is in threaded engagement with sleeve 6 by means of a thread corresponding to the fine pitch thread 6c. Liner 7 has a blindbore extending axially from its leading end and the bore has a conventional or standard thread 7a. Further, at its trailing end the liner 7 extended axially from the sleeve 6 and has rotary driving means 7b. Liner 7 is connected with the anchor rod 3 by means of the threaded engagement of the threads 3a, 7a. Adjacent its trailing end, the liner 7 has markings 7c, 7d. In FIG. 1 the marking 7d is visible at the trailing end 6a of the sleeve 6 and in FIG. 2 both of the markings 7c, 7d are visible. The leading end of the sleeve 6 is supported in the housing 4 by an axial bearing 8. Adjacent the trailing end of the housing 4, a snap ring 9 secures the connection between the housing 4 and the socket 5, or between the housing 4 and the sleeve 6.

In the initial position of the anchor inserted into the borehole in the structure 1, the liner is threaded onto the trailing end of the anchor rod 3 so that the housing 4 rests at the trailing end of the expansion sleeve 2. After this threaded engagement has been effected, the setting device along with the anchor is introduced into the borehole 1a in the structure 1 with the expansion member 3b located in the base of the borehole and with the leading end region of the expansion sleeve 2 located in the axially extending region of the undercut 1b. The driving means 7b at the trailing end of the liner 7 serves to thread the liner onto the thread 3a on the anchor rod 3. Subsequently, the sleeve 6 is turned, using the engagement means 6b, relative to the housing 4 and the liner 7. As a result, since the sleeve 6 remains stationary in the axial direction, there is axial displacement of the liner 7 relative to the housing 4, the sleeve 6, and the anchor rod 3, so that the anchor rod 3 moves opposite to the insertion direction and the expansion member 3b is telescoped into the expansion sleeve 2. Such movement takes place due to the fine pitch thread 6c. As a result, liner 7 moves axially relative to the sleeve 6 by the maximum amount shown by the displacement dimension x. The displacement dimension x indicates the maximum possible expansion travel. In the expansion travel, the expansion member 3b moves into the leading end of the expansion sleeve 2 expanding the slotted segments at the leading end of the expansion sleeve into the undercut 1b.

In the expanded condition, as displayed in FIG. 2, liner 7 has been displaced axially relative to the sleeve 6 by the dimension x until the liner contacts an inwardly directed shoulder within the sleeve. From the outside of the setting device, this displacement can be recognized because the marking 7c becomes visible at the trailing end 6a of the sleeve. The markings 7c, 7d can be provided in color so as to be more easily recognized. After the expanded condition shown in FIG. 2 has been achieved, with the anchor secured in the undercut 1b in a positively locked manner, the liner 7 is backed off the anchor rod 3 by means of the rotary driving means 7b. Next the setting device can be removed and a load applied to the threaded trailing end of the anchor rod 3.

While specific embodiments of the invention have been shown and described in detail to illustrate the application of the inventive principles, it will be understood that the invention may be embodied otherwise without departing from such principles.

I claim:

1. Device for setting anchors comprising an axially extending expansion sleeve (2), an axially extending anchor rod (3) located within and extending through said expansion sleeve (2), said expansion sleeve (2) and anchor rod (3) each have a leading end and a trailing end relative to the insertion direction of said expansion sleeve (2) and anchor rod (3) into a borehole, said anchor rod (3) has an expansion member (3b) at the leading end thereof, a housing (4) encircles a section of said anchor rod (3) adjacent the trailing end thereof, an axially extending socket (5) is located in part within said housing (4) and laterally encloses the trailing end of said anchor rod (3), said socket (5) having engagement means (6b) thereon for turning said socket (5) having the axis of said anchor rod (3) relative to said housing (4) and anchor rod (3), wherein the improvement comprises that said socket (5) comprises an axially extending sleeve (6) with said engagement means (6b) at a trailing end thereof, and an axially extending tubular liner (7) located within said sleeve (6), said sleeve (6) and liner (7) are disposed in threaded engagement (6c), said liner (7) has a thread (7a) in threaded engagement (3a) on said anchor rod and forming a threaded engagement between said socket (5) and anchor rod.

2. Device, as set forth in claim 1, wherein said threaded engagement (6c) comprises fine pitch threads on said sleeve (6), and liner (7).

3. Device, as set forth in claim 2, wherein the lead of said fine pitch threads is in the range of 1 to 3 mm.

4. Device, as set forth in claim 1, wherein said sleeve (6) laterally encloses said liner (7) and said sleeve (6) is concentric relative to said liner (7).

5. Device, as set forth in claim 4, wherein said liner (7) has a trailing end relative to the insertion direction projecting axially beyond a corresponding trailing end (6a) of said sleeve.

6. Device, as set forth in claim 5, wherein the axially extending part of said liner (7) projecting from said sleeve (6) comprises rotary driving means (7b).

7. Device, as set forth in claim 6, wherein an axially extending section of said liner (7) extending from the trailing end thereof has axially spaced markings (7c, 7d) thereon for indicating the unexpanded and expanded conditions of said anchor rod (3).

* * * * *